(12) United States Patent
Huang

(10) Patent No.: US 12,221,803 B2
(45) Date of Patent: Feb. 11, 2025

(54) THERMAL INSULATION COVER FOR POOL, AND ABOVE-GROUND POOL

(71) Applicant: BESTWAY INFLATABLES & MATERIAL CORP., Shanghai (CN)

(72) Inventor: Shuiyong Huang, Shanghai (CN)

(73) Assignee: BESTWAY INFLATABLES & MATERIAL CORP., Shanghai (CN)

( * ) Notice: Subject to any disclaimer, the term of this patent is extended or adjusted under 35 U.S.C. 154(b) by 168 days.

(21) Appl. No.: 17/980,729

(22) Filed: Nov. 4, 2022

(65) Prior Publication Data

US 2023/0399865 A1 Dec. 14, 2023

(30) Foreign Application Priority Data

Jun. 14, 2022 (CN) .......................... 202221487978.1

(51) Int. Cl.
  *E04H 4/08* (2006.01)
  *B32B 3/06* (2006.01)
  *B32B 5/02* (2006.01)
  *B32B 27/12* (2006.01)
  *B32B 27/30* (2006.01)
  (Continued)

(52) U.S. Cl.
  CPC ................. *E04H 4/08* (2013.01); *B32B 3/06* (2013.01); *B32B 5/02* (2013.01); *B32B 27/12* (2013.01); *B32B 27/304* (2013.01); *B32B 27/36* (2013.01); *B32B 5/26* (2013.01); *B32B 2262/0261* (2013.01); *B32B 2262/0276* (2013.01); *B32B 2305/38* (2013.01); *B32B 2307/5825* (2013.01); *B32B 2307/7265* (2013.01); *B32B 2435/00* (2013.01)

(58) Field of Classification Search
  CPC .... E04H 4/08; B32B 3/06; B32B 5/02; B32B 5/26; B32B 27/12; B32B 27/304; B32B 27/36
  USPC .............................................. 4/498
  See application file for complete search history.

(56) References Cited

U.S. PATENT DOCUMENTS

| | | | | |
|---|---|---|---|---|
| 5,685,031 A | * | 11/1997 | Watkins | E04H 4/08 4/498 |
| 2002/0108170 A1 | * | 8/2002 | Minnick | E04H 4/08 4/498 |

(Continued)

FOREIGN PATENT DOCUMENTS

| | | |
|---|---|---|
| CN | 207568250 U | 7/2018 |
| CN | 207647246 U | 7/2018 |
| DE | 202014009658 U1 | 5/2015 |

OTHER PUBLICATIONS

Extended European Search Report dated Aug. 10, 2023 (Aug. 10, 2023), 27 pages, issued on related European patent application 22210392.1 by the European patent office.

*Primary Examiner* — Huyen D Le
(74) *Attorney, Agent, or Firm* — DICKINSON WRIGHT PLLC

(57) ABSTRACT

A thermal insulation cover for a pool, and an above-ground pool are provided. The thermal insulation cover comprises: a side wall portion, which is annular and is adapted to surround a wall of a pool; and a top cover portion comprising an outer circumference connected to a top circumference of the side wall portion. Each of the side wall portion and the top cover portion comprises an outer layer, an inner layer, and a filling layer disposed between the outer layer and the inner layer. The filling layer may be polyester batting.

9 Claims, 2 Drawing Sheets

(51) Int. Cl.
  *B32B 27/36* (2006.01)
  *B32B 5/26* (2006.01)

(56) References Cited

U.S. PATENT DOCUMENTS

2017/0314281 A1* 11/2017 Young .................. B32B 7/09
2020/0199899 A1* 6/2020 Huang .................. B32B 15/14
2022/0064976 A1 3/2022 Huang

* cited by examiner

THERMAL INSULATION COVER FOR POOL, AND ABOVE-GROUND POOL

CROSS-REFERENCE TO RELATED APPLICATION

This Application claims priority from Chinese Application CN 202221487978.1, filed Jun. 14, 2022 in China, the disclosure of which is incorporated herein by reference in its entirety.

BACKGROUND

1. Field

Apparatuses and methods consistent with exemplary embodiments relate to above-ground pools and more particularly to a thermal insulation cover for a pool, and an above-ground pool comprising the thermal insulation cover.

2. Description of the Related Art

Above-ground pools are popular with consumers because of their ease of carrying and installation and good effect in use. Since an above-ground pool is usually disposed outdoors, and the decrease in outdoor temperature will lead to the loss of heat in the pool, it is desirable to provide a reasonable thermal insulation device for the pool.

An existing thermal insulation cover for a pool is made of a thick and heavy material, and is inconvenient to fold and store.

SUMMARY

Example embodiments may address at least the above problems and/or disadvantages and other disadvantages not described above. Also, example embodiments are not required to overcome the disadvantages described above, and may not overcome any of the problems described above.

BRIEF DESCRIPTION OF THE DRAWINGS

The above and/or other aspects will become apparent and more readily appreciated from the following description of example embodiments, taken in conjunction with the accompanying drawings, in which.

DETAILED DESCRIPTION

Figure 1:
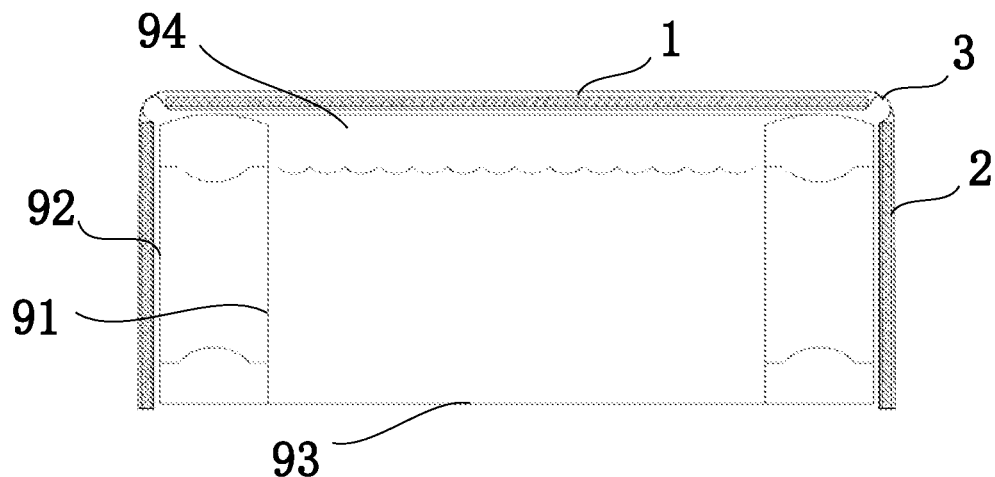
FIG. 1 is a schematic cross-sectional diagram of an embodiment of an above-ground pool according to an example embodiment.

Reference will now be made in detail to example embodiments which are illustrated in the accompanying drawings, wherein like reference numerals refer to like elements throughout. In this regard, the example embodiments may have different forms and may not be construed as being limited to the descriptions set forth herein.

It will be understood that the terms "include," "including", "comprise, and/or "comprising," when used in this specification, specify the presence of stated features, integers, steps, operations, elements, and/or components, but do not preclude the presence or addition of one or more other features, integers, steps, operations, elements, components, and/or groups thereof.

It will be further understood that, although the terms "first," "second," "third," etc., may be used herein to describe various elements, components, regions, layers and/or sections, these elements, components, regions, layers and/or sections may not be limited by these terms. These terms are only used to distinguish one element, component, region, layer or section from another element, component, region, layer or section.

As used herein, the term "and/or" includes any and all combinations of one or more of the associated listed items. Expressions such as "at least one of," when preceding a list of elements, modify the entire list of elements and do not modify the individual elements of the list.

Various terms are used to refer to particular system components. Different companies may refer to a component by different names—this document does not intend to distinguish between components that differ in name but not function.

Matters of these example embodiments that are obvious to those of ordinary skill in the technical field to which these exemplary embodiments pertain may not be described here in detail.

The implementation and application of example embodiments will be discussed in detail below. However, it should be understood that the specific example embodiments discussed herein only illustratively describe the specific implementation and application of certain example embodiments and are not intended to limit the scope of protection.

According to one or more example embodiments, a thermal insulation cover for a pool and an above-ground pool are provided. It is noted that the above-ground pool may be an inflatable pool.

As shown in FIG. 1, according to an example embodiment, the inflatable pool comprises a pool bottom 93 and an inflatable pool wall surrounding the pool bottom 93. The inflatable pool wall comprises an inner pool wall 91 and an outer pool wall 92. The inner pool wall 91 and the pool bottom 93 define a water storage cavity, and the top of the inner pool wall 91 defines a pool opening 94. Of course, the thermal insulation cover is not limited to be applied to the inflatable pool, and can also be applied to other types of above-ground pools, such as a bracket pool.

Figure 2:
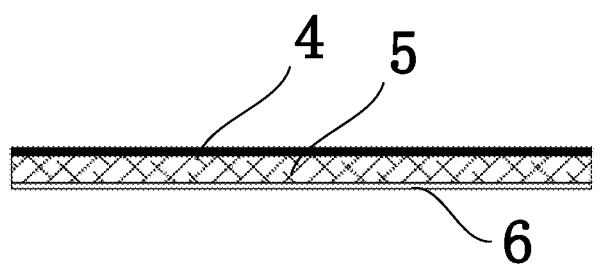
FIG. 2 is a schematic structural diagram of a material of a thermal insulation cover of the above-ground pool in FIG. 1, according to an example embodiment.
Figure 3:
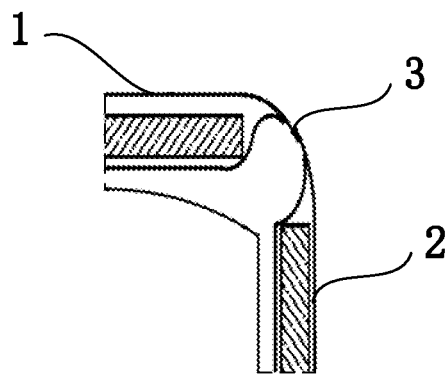
FIG. 3 is a schematic enlarged diagram of the connecting portion between a top cover portion and a side wall portion of the thermal insulation cover of the above-ground pool in FIG. 1, according to an example embodiment.

As shown in FIGS. 1 to 3, the thermal insulation cover according to an example embodiment comprises a top cover portion 1 and a side wall portion 2. The side wall portion 2 is annular and is adapted to fit with the outer pool wall 92, and the top cover portion 1 is connected to the top of the side wall portion 2 and has a size and shape configured to completely cover the top of the pool. The top cover portion 1 and the side wall portion 2 may be manufactured separately first and then connected with each other. The connection at the connecting portion 3 between the top cover portion 1 and the side wall portion 2 may be achieved by means of at least one of sewing, zip-fastening, and welding. The outer pool wall 92 and the top are covered by the thermal insulation cover, which may effectively reduce heat loss of the inflatable pool and reduce energy consumption.

Each of the top cover portion 1 and the side wall portion 2 of the thermal insulation cover comprises an outer layer 4 (the layer furthest from the outer pool wall 92), an inner layer 6 (the layer closest to the outer pool wall 92), and a filling layer 5 disposed between and connecting the outer layer 4 and the inner layer 6. The outer layer 4 of the thermal insulation cover may be made of a laminated mesh material, the inner layer 6 may be made of polyester cloth, and the filling layer 5 is polyester batting. Alternately, either of the inner layer and the outer layer may be made of one or more polymer materials including, but not limited to polyvinyl chloride (PVC), thermoplastic polyurethane (TPU), thermoplastic rubber (TPR), and ethylene-vinyl acetate (EVA). The thermal insulation cover of this example embodiment may be light in weight, small in size after being folded, and convenient to carry and store. In addition, the thermal insulation cover may also be provided with a plurality of filling layers 5 arranged in stack to further improve the thermal insulation effect.

The laminated mesh material of the outer layer 4 of the thermal insulation cover comprises a surface layer, a bottom layer, and an intermediate mesh layer sandwiched between the surface layer and the bottom layer. The surface layer and the bottom layer of the laminated mesh material are respectively made of polyvinyl chloride or polyester, and the intermediate mesh layer is made of polyester mesh cloth or nylon mesh cloth. The laminated mesh material is waterproof and tear-resistant, has good tensile strength, and is anti-aging, such that the thermal insulation cover can remain intact under various external environmental changes to improve the service life.

Figure 4:
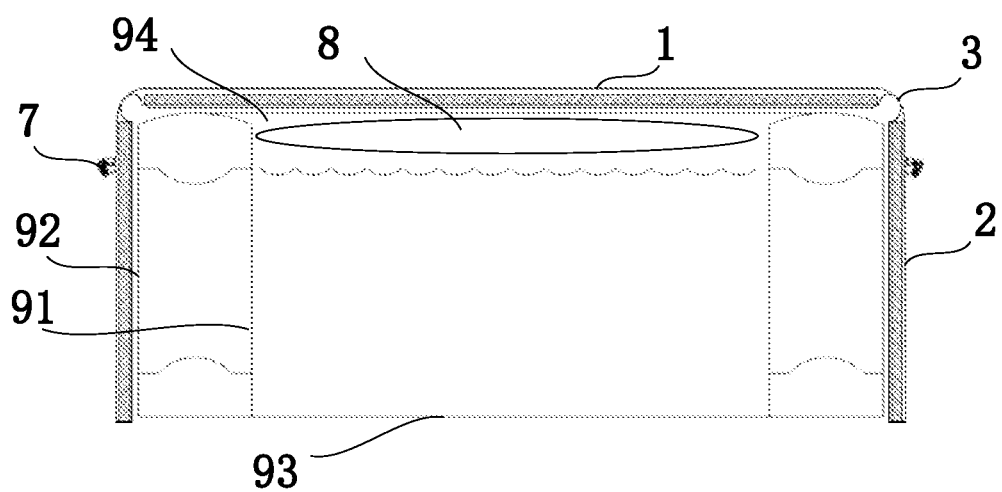
FIG. 4 is a schematic cross-sectional diagram of the above-ground pool in FIG. 1 used cooperatively with a handle and a top cover liner, according to an example embodiment.

As shown in FIG. 4, the thermal insulation cover may be further provided with at least one handle 7 on an outer surface thereof (such as a surface of the outer layer 4 of the side wall portion 2), such that a user can move the pool when the thermal insulation cover is sheathed over the outer pool wall 92. For example, the thermal insulation cover may comprise a plurality of handles 7 circumferentially and uniformly arranged on the surface of the outer layer 4 of the side wall portion 2.

The thermal insulation cover may also be used cooperatively with a top cover liner 8 to further reduce the heat loss in the pool. The size and shape of the top cover liner 8 may match that of the pool opening 94. The top cover liner 8 may include an inflatable structure, or may be additionally provided with a thermal insulation layer inside. The top cover liner 8 may float on a surface of the pool alone, or may be connected to the thermal insulation cover in any convenient, detachable manner, such as by means of snap fitting, zipper fitting, or dual-lock fitting.

It may be understood that the exemplary embodiments described herein may be considered in a descriptive sense only and not for purposes of limitation. Descriptions of features or aspects within each exemplary embodiment may be considered as available for other similar features or aspects in other exemplary embodiments.

While exemplary embodiments have been described with reference to the figures, it will be understood by those of ordinary skill in the art that various changes in form and details may be made therein without departing from the spirit and scope as defined by the following claims.

What is claimed is:

1. A cover comprising:
    a side wall portion, which is annular and is adapted to surround a wall of a pool; and
    a top cover portion comprising an outer circumference connected to a top circumference of the side wall portion,
    wherein each of the side wall portion and the top cover portion comprises:
        an outer layer comprising a laminated mesh material comprising:
            a surface layer comprising one of polyvinyl chloride and polyester,
            a bottom layer comprising one of polyvinyl chloride and polyester, and
            an intermediate mesh layer disposed between the surface layer and the bottom layer;
        an inner layer comprising polyester cloth; and
        a filling layer disposed between the outer layer and the inner layer, wherein the filling layer comprises polyester batting.

2. The cover according to claim 1, further comprising a connection portion, connecting the top cover portion and the side wall portion, the connection portion comprising at least one of a sewn connection, a zip-fastener, and a welded connection.

3. The cover according to claim 1, wherein the intermediate mesh layer comprises one of polyester mesh cloth and nylon mesh cloth.

4. An above-ground pool, comprising:
    a pool bottom; a pool wall surrounding the pool bottom; and
    a cover according to claim 1.

5. The above-ground pool according to claim 4, wherein a pool opening is defined at a top of the pool wall, and the cover further comprises a top cover liner detachably connected to the top cover portion and having a size and shape to thereby cover the pool opening.

6. The above-ground pool according to claim 4, wherein the above-ground pool is one of an inflatable pool and a bracket pool.

7. A thermal insulation structure comprising:
    an annular sidewall portion; and
    a cover portion comprising an outer circumference connected to a circumference of the annular sidewall portion;
    wherein each of the annular sidewall portion and the cover portion comprises:
        an outer layer comprising a laminated mesh material comprising:
            a surface layer comprising one of polyvinyl chloride and polyester,
            a bottom layer comprising one of polyvinyl chloride and polyester, and
            an intermediate mesh layer disposed between the surface layer and the bottom layer;
        an inner layer comprising polyester cloth; and
        a filling layer disposed between the outer layer and the inner layer, the filling layer comprising polyester batting.

8. The thermal insulation structure according to claim 7, further comprising a connection portion connecting the cover portion and the annular side wall portion, the connection portion comprising at least one of a sewn connection, a zip-fastener, and a welded connection.

9. The thermal insulation structure according to claim 7, wherein the intermediate mesh layer comprises one of polyester mesh cloth and nylon mesh cloth.

* * * * *